US012226792B2

(12) United States Patent
Pahl

(10) Patent No.: US 12,226,792 B2
(45) Date of Patent: Feb. 18, 2025

(54) NOZZLE ARRANGEMENT FOR APPLYING FLUIDS, AND METHOD FOR PRODUCING A MAIN BODY OF SUCH A NOZZLE ARRANGEMENT

(71) Applicant: Illinois Tool Works Inc., Glenview, IL (US)

(72) Inventor: Andreas Pahl, Erkrath (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 795 days.

(21) Appl. No.: 16/814,650

(22) Filed: Mar. 10, 2020

(65) Prior Publication Data

US 2020/0290125 A1   Sep. 17, 2020

(30) Foreign Application Priority Data

Mar. 11, 2019   (DE) ..................... 10 2019 106 163.6

(51) Int. Cl.
*B29C 64/153* (2017.01)
*B05B 7/08* (2006.01)
(Continued)

(52) U.S. Cl.
CPC ............ *B05B 7/0884* (2013.01); *B22F 10/28* (2021.01); *B22F 10/80* (2021.01); *B22F 12/53* (2021.01);
(Continued)

(58) Field of Classification Search
CPC .......... B22F 12/00; B22F 10/28; B22F 10/80; B22F 10/10; B22F 10/02; B29C 64/153;
(Continued)

(56) References Cited

U.S. PATENT DOCUMENTS

| 5,769,947 | A | 6/1998 | Krappweis |
| 2012/0228397 | A1* | 9/2012 | Thomson .............. F23D 11/107 239/553 |
| 2016/0144622 | A1 | 5/2016 | Lessley et al. |

FOREIGN PATENT DOCUMENTS

| DE | 112009000822 | T5 | 3/2011 |
| DE | 102016113977 | A1 | 2/2018 |

(Continued)

OTHER PUBLICATIONS

International Preliminary Report on Patentability mailed Sep. 23, 2021 for corresponding application No. PCT/US2020/022012 (7 pages).

(Continued)

*Primary Examiner* — Anthony M Liang
*Assistant Examiner* — Danny N Kang
(74) *Attorney, Agent, or Firm* — The Small Patent Law Group LLC; Christopher R. Carroll

(57) ABSTRACT

A nozzle arrangement for applying fluids to a substrate has a main body which is able to be connected to a mounting region of a distributor and which has an end-side side surface. At least one first outlet nozzle for the fluid to be applied to the substrate is provided in or on the end-side side surface of the main body. A first fluid channel system is formed in the main body, via which the at least one first outlet nozzle is connected in terms of flow to a first fluid connector, which is provided in the main body of the nozzle arrangement. The nozzle arrangement is a monolithic component produced by an additive production method.

5 Claims, 3 Drawing Sheets

(STATE OF THE ART)

(51) Int. Cl.
  *B22F 10/28* (2021.01)
  *B22F 10/80* (2021.01)
  *B22F 12/53* (2021.01)
  *B22F 12/55* (2021.01)
  *B29C 64/209* (2017.01)
  *B33Y 10/00* (2015.01)
  *B33Y 30/00* (2015.01)

(52) U.S. Cl.
  CPC ............ *B22F 12/55* (2021.01); *B29C 64/153* (2017.08); *B29C 64/209* (2017.08); *B33Y 10/00* (2014.12); *B33Y 30/00* (2014.12)

(58) Field of Classification Search
  CPC ....... B29C 64/209; B33Y 10/00; B33Y 30/00; Y02P 10/25; B05C 5/027; B05B 7/0884; B05B 7/0815
  See application file for complete search history.

(56) References Cited

FOREIGN PATENT DOCUMENTS

| | | |
|---|---|---|
| DE | 102017202258 B3 | 7/2018 |
| DE | 102017207851 A1 | 11/2018 |
| DE | 102018127277 A1 | 4/2020 |
| EP | 0835952 B1 | 10/1997 |
| EP | 0835952 A1 | 4/1998 |
| EP | 0872580 A1 | 6/2005 |
| EP | 2145695 A1 | 1/2010 |
| EP | 3290121 A1 | 3/2018 |
| WO | 0069571 A1 | 11/2000 |
| WO | WO-2009126534 A1 * | 10/2009 ................ F23R 3/14 |
| WO | 2017115096 A1 | 7/2017 |

OTHER PUBLICATIONS

International Preliminary Report on Patentability mailed Jun. 3, 2020 for corresponding International Application No. PCT/US2020/022012.

Examination Report mailed Oct. 23, 2019 for DE 10 2019 106 163.6 (6 pages).

Office Action for corresponding DE Application No. 10 2019 106 163.6.

Wikipedia: Selektives Laserschmelzen. 2016. S. 1-6. URL: https://de.wikipedia.org/wiki/Selektives_Laserschmelzen, Archiviert in https://archive.org/web/ am Sep. 24, 2016 [abgerufen am Jun. 27, 2022].

Oerlikon metco: Material Product Data Sheet—Cobalt-Chromium Alloy Powders for Additive Manufacturing. 2016. S. 1-3.—Firmenschrift.

Office Action mailed Jan. 9, 2024 for corresponding DE Application No. 10 2019 106 163.6 (11 pages).

* cited by examiner (STATE OF THE ART)

(STATE OF THE ART)

NOZZLE ARRANGEMENT FOR APPLYING FLUIDS, AND METHOD FOR PRODUCING A MAIN BODY OF SUCH A NOZZLE ARRANGEMENT

CROSS-REFERENCE TO RELATED APPLICATIONS

This application claims priority to DE patent application 10 2019 106 163.6 pursuant to 35 U.S.C. § 119 and 37 C.F.R. § 1.55, which was filed on 11 Mar. 2019, and the entire disclosure of which is incorporated herein by reference.

BACKGROUND

Technical Field

The inventive subject matter relates in general to the applying of fluids, including thermoplastic or fibrous adhesives, to a substrate through at least one nozzle arrangement which is preferably releasably secured to a mounting surface of a distributor or a distributor head.

The distributor or distributor head generally serves for supplying the fluid being applied to the at least one nozzle arrangement. The purpose of such a system is to apply fluids to substrates which are moving for example relative to the at least one nozzle arrangement, in particular to apply adhesives in partial spraying patterns for the partial covering of a substrate.

Discussion of Art

Document EP 0 872 580 A discloses for example a plurality of melt blowing nozzle arrangements or nozzles which can be secured, side by side, to one or both ends of a conventional distributor or distributor head, which ensures a metered supplying of adhesive to each nozzle arrangement. The nozzle arrangements each comprise a plurality of substantially parallel plate elements, forming a row of adhesive dispensing openings on an exit surface. The row of fluid outlet openings of each nozzle arrangement forms a section of a longer row, formed by the plurality of adjacent nozzle arrangements, which are situated along a common end of the distributor head. One or both sides of the distributor can be secured next to the side of a similarly constructed distributor head in order to form even longer rows of fluid outlet openings, thereby providing a modular melt blowing adhesive dispensing system to accommodate substrates of any dimensional width.

The nozzle arrangements considered here have a very compact design. In particular, it is desirable to accommodate in the main body of the nozzle arrangement the highest possible number of outlet nozzles for the fluid being applied to the substrate and/or for other fluids, such as shaping air. In this way, an extremely flat and uniform application of fluids to the substrate surface is possible.

However, the number of outlet nozzles per main body of a nozzle arrangement cannot be increased arbitrarily, since a fluid channel system needs to be formed for each outlet nozzle inside the main body, in order to connect the outlet nozzle fluidically to a fluid port, likewise provided on the main body of the nozzle arrangement. This fluid port on the main body of the nozzle arrangement can be connected to a complementary port of a distributor or distributor head when the nozzle arrangement is mounted in the mounting region of the distributor/distributor head.

FIG. 1 shows part of a conventional nozzle arrangement known from the prior art, revealing the laminated construction.

FIG. 2 shows the nozzle assembly of FIG. 1 in an exploded view.

Specifically, it will be noticed in FIGS. 1 and 2 that the conventional nozzle arrangement 100 is formed from a number of individual plates 101.1 to 101.6, which are joined flush with each other in the assembled state (see FIG. 1). For this, a pin element may be used, for example, which is inserted through a corresponding hole 102 or through a corresponding opening in the individual plates 101.1 to 101.6 and holds the individual plates 101.1 to 101.6 together.

Recesses or holes 103 to 107 are provided in the individual plates 101.1 to 101.6, which in the assembled state form a fluid channel system in the main body 101 of the nozzle arrangement 100, in order to connect the individual outlet nozzles 108 at one end face of the nozzle assembly fluidically to the fluid port on the main body 101 of the nozzle assembly.

With the aid of the drawings in FIGS. 1 and 2 it can be seen that the laminated construction of the nozzle arrangement 100 does not allow the forming of arbitrarily designed fluid channel systems inside the main body 101. Furthermore, the number of individual fluid channel systems in the main body 101 of the nozzle arrangement 100 is limited, as is the number of individual outlet nozzles 108, 109 on the end-side lateral surface of the main body 101, serving to dispense an adhesive or to dispense shaping air and being arranged alternating with each other in a row.

BRIEF DESCRIPTION

Based on this statement of the problem, the problem which the inventive subject matter proposes to solve is to modify a nozzle arrangement of the kind mentioned above so that a larger number of outlet nozzles and/or a more complex fluid channel system can be provided in the main body of the nozzle arrangement.

In particular, a solution should be provided with which the fluid channel systems formed in the main body of the nozzle arrangement can be adapted to the particular application as optimally as possible. Optimal means in this context that the fluid channel systems being formed inside the main body have a configuration such that the flow resistance in particular can be reduced.

This problem is solved according to the inventive subject matter by the subject matter of the independent patent claim 1, which concerns a nozzle arrangement for the applying of fluids, especially thermoplastic adhesives, to a substrate.

The nozzle arrangement according to the inventive subject matter comprises—like the nozzle arrangements of this kind that are known in the prior art—a main body which is able to be connected, preferably exchangeably, to a mounting region of a distributor or distributor head and having an end-side lateral surface. In or on the end-side lateral surface of the main body there is provided at least one and preferably a plurality of first outlet nozzles for the fluid to be applied to the substrate.

Furthermore, it is provided according to the inventive subject matter that there is formed in the main body a first fluid channel system, via which the at least one first outlet nozzle is connected fluidically to a first fluid port, which is provided in the main body of the nozzle arrangement.

Unlike the nozzle arrangements known in the prior art, it is provided according to the inventive subject matter that the nozzle arrangement is a monolithic component produced by an additive manufacturing method.

Accordingly, a traditional laminated construction of the nozzle arrangement is deliberately avoided in this application. Instead, it is proposed to form at least the main body of the nozzle arrangement together with the fluid channel system provided in the main body and together with the at least one outlet nozzle provided on or in the end face of the main body with the aid of an additive manufacturing method.

This allows for significantly more complex geometries and configurations, especially for the at least one first fluid channel system inside the main body. Moreover, significantly more complex structures can be realized and a significantly larger number of outlet nozzles at or in the end face of the main body, given the same geometrical dimensions of the main body.

As a further advantage, it should be mentioned in particular that even complex fluid channel systems can be realized inside the main body with the aid of the additive manufacturing method. Such complex fluid channel systems may have at least partially three-dimensional curved fluid channel sections.

In other words, with the inventive subject matter the fluid channel systems inside the main body of the nozzle arrangement can be optimally adapted to the particular application. Thanks to the possibility of forming three-dimensional curved fluid channel sections inside the main body of the nozzle arrangement, the flow behavior of the fluid being supplied through the main body can also be adapted or optimized, especially in regard to the least possible flow resistance.

According to embodiments of the inventive subject matter, in or on the end-side lateral surface of the main body there is provided at least one second outlet nozzle and preferably a plurality of second outlet nozzles for the purpose of dispensing shaping air in a targeted manner in order to influence, for example, the direction of a fluid jet discharged from the at least one first outlet nozzle. The at least one second outlet nozzle is connected fluidically to a second fluid port, which is provided on the main body of the nozzle arrangement, via a second fluid channel system formed in the main body.

Thanks to the additive manufacturing method it is possible for the second fluid channel system to also have at least one fluid channel section formed in a partially three-dimensionally curved manner and thus to optimize the supply of fluid to the second outlet nozzle especially in terms of the expected flow resistance.

The additive manufacturing method by which the nozzle arrangement is created, according to realizations of the solution according to the inventive subject matter, has the step of determining three-dimensional information about the main body, wherein the main body contains the at least one first and/or at least one second outlet nozzle, and the first and/or second fluid channel system is formed integrally in the main body.

The additive manufacturing method has the further step of converting the three-dimensional information into a plurality of layers, these layers defining the cross-sectional layers of the main body. At least one empty space within at least one of the layers is defined, which defines the first and/or second fluid channel system.

Finally, each layer of the main body is formed in succession, in particular by melting a metallic powder using laser energy and/or electrode beam energy.

Of course, however, it is also conceivable that the individual layers of the main body are formed from another material, such as ceramic material or plastic material.

Preferably, a laser sintering method or a direct metal laser sintering (DMLS) method is used during the additive manufacturing method.

The successive forming of each layer of the main body by melting a metallic powder using laser energy moreover involves, according to modifications of the solution according to the inventive subject matter, a melting of a metallic powder comprising at least one of cobalt-chromium, HS188 and INCO625.

Alternatively or additionally, the successive forming of each layer of the main body by melting a metallic powder using laser energy can moreover involve a melting of a metallic powder having a particle size between approximately 10 μm and approximately 75 preferably between approximately 15 μm and approximately 30 μm.

According to one preferred realization of the nozzle arrangement according to the inventive subject matter, an extension region is formed by the additive manufacturing method on the end-side lateral surface of the main body, in which the at least one first outlet nozzle is formed, wherein the extension region and the at least one first outlet nozzle are formed such that the outlet opening of the at least one first outlet nozzle is at a distance from the end-side lateral surface of the main body, and wherein a main flow axis which is predefined by the at least one first outlet opening, along which the fluid is discharged from the at least one first outlet nozzle, makes an acute angle with the end-side lateral surface of the main body.

This modification of the nozzle arrangement according to the inventive subject matter is in particular an optimized nozzle arrangement for the applying of fluids, especially thermo-plastic adhesives, to substrates having a correspondingly complex geometry and therefore requiring a corresponding application method.

Because of the fact that the nozzle arrangement in this embodiment is provided with a corresponding extension region in which the at least one first outlet nozzle is formed, the nozzle arrangement, especially when it is arranged [in] a distributor head carried on a robot arm, can also be used in flexible manner in areas of complex geometry without the danger of the nozzle arrangement or the distributor head coming into contact with areas of the substrate being coated.

Moreover, it is ensured that the nozzle outlet opening of the at least one first outlet nozzle always maintains the given distance from the surface of the area of the substrate being coated. In particular, the special geometry of the nozzle arrangement with the extension region allows the nozzle arrangement to also be swiveled and turned relative to the substrate being coated or the area of the substrate being coat-ed, which is necessary for a uniform wetting of the area with the fluid, especially the thermoplastic adhesive.

According to preferred realizations of the last mentioned embodiment of the nozzle arrangement according to the inventive subject matter, it is provided in particular that—looking in plan view—the main body of the nozzle arrangement is at least substantially rectangular. Moreover, it is provided that—likewise looking in plan view—the extension region of the nozzle arrangement is at least substantially trapezoidal or triangular, especially trapezoidal, and is connected by its longer base side to the end face of the main body.

Because of the fact that the main body in this embodiment—as in the prior art—has an at least substantially rectangular configuration (again in plan view), the nozzle arrangement can again be connected to the mounting region of the distributor head without requiring design changes to the mounting region or to the distributor head. The same also holds for the fluid distribution system which is provided by the distributor head and which is provided by a corresponding intersection region with the fluid channel system integrated in the main body of the nozzle arrangement.

In modification of the last mentioned embodiment it is provided in particular that one leg of the especially trapezoidal extension region in plan view is flush with a lateral surface of the main body. Alternatively or additionally, it can be provided that the at least one outlet opening is formed in one leg of the especially trapezoidal extension region in plan view, situated opposite the leg which is flush with the lateral surface of the main body of the nozzle arrangement.

These modifications are especially easy to realize, yet still effective solutions for designing the nozzle arrangement according to the inventive subject matter so that even particular-ly complex geometrical regions of the substrate being coated can effectively arrive in the area of the at least one first outlet nozzle of the nozzle arrangement without any contact occurring between the nozzle arrangement or the distributor or distributor head and the substrate.

According to the inventive subject matter, it is provided that the entire nozzle arrangement is a monolithic component created by an additive manufacturing method. In other words, all structural features of the nozzle arrangement are formed integrally in the main body of the nozzle arrangement. The integral design has the advantage that the entire nozzle arrangement and especially the orientation of the at least one first outlet nozzle or the outlet opening of the at least one first outlet nozzle and the corresponding fluid channel system in the interior of the main body of the nozzle arrangement can be produced with high precision and only extremely small tolerances.

All in all, the configuration of the nozzle arrangement according to the inventive subject matter as a monolithic nozzle subassembly makes possible a compact nozzle arrangement in which all necessary functionalities are integrated.

According to realizations of the solution according to the inventive subject matter, it is provided that the nozzle arrangement is produced by means of 3D printing. In particular, the laser sintering method or microlaser sintering, also known as selective laser melting (SLM), can be used here. Thanks to this manufacturing method, the at least one first fluid channel system inside the main body of the nozzle arrangement can have a curved configuration in multiple planes, in order to achieve perfect flows. Further-more, no mounting of the first outlet nozzle on the main body of the nozzle arrangement is necessary, since the latter is also integrated with the main body of the nozzle arrangement. In this way, every possible assembly error and every tolerance discrepancy due to the assembly process can be prevented.

In the former laminar designed nozzle (prior art), a metallic sealing is accomplished only by screwing together the individual nozzle plates by the outer clamping plates. It is a constant challenge in this case to put enough screws in place to achieve an adequate surface pressure. This also means a design limitation, since no glue and/or air channels can be placed in the position of the screws (and additional positioning pins). Minimum distances from the screw boreholes also have to be maintained in order to achieve the sealing. Leakage also occurs constantly in the case of newly designed nozzles.

According to one aspect of the inventive subject matter, it is provided that the fluid, especially the thermoplastic adhesive, can be dispensed with the at least one first outlet nozzle in a predetermined event sequence. In particular, the nozzle arrangement according to the inventive subject matter is suitable for dispensing the fluid (that is, the thermoplastic adhesive) with a pattern, especially an oscillating pattern.

For this, it is provided according to embodiments of the nozzle arrangement according to the inventive subject matter that the outlet opening of the at least one first outlet nozzle of the nozzle arrangement is preferably coordinated with a plurality of fluid openings of second outlet nozzles, where these fluid openings dispense forming or deflecting air, in order to specifically deflect the fluid dispensed from the outlet opening of the at least one first outlet nozzle from the main flow axis. The plurality of the (additional) fluid openings, which are provided by the second outlet nozzles and which serve for dispensing corresponding forming or deflecting air, may be slanted to converge on the main flow axis of the outlet opening of the first outlet nozzle.

The inventive subject matter is not confined to nozzle arrangements having a corresponding extension region for example at the end-side lateral surface of the main body. Instead, the inventive subject matter is especially suitable for all nozzle arrangements having a relatively com-plex construction, and/or requiring an elevated number of outlet nozzles (first and/or second outlet nozzles).

The inventive subject matter moreover relates to a corresponding method for producing a main body of a nozzle arrangement for applying fluids, in particular thermoplastic adhesives, to a substrate, wherein the main body has at least one first outlet nozzle and preferably at least one second outlet nozzle, and wherein, in the main body, there are/is formed at least one first fluid channel system and/or at least one second fluid channel system, via which the at least one first and/or at least one second outlet nozzle are/is connected fluidically to a first and/or second port on the main body of the nozzle arrangement.

Example embodiments of the solution according to the inventive subject matter will be described more closely below, making reference to the enclosed drawings.

DETAILED DESCRIPTION

Figure 1:
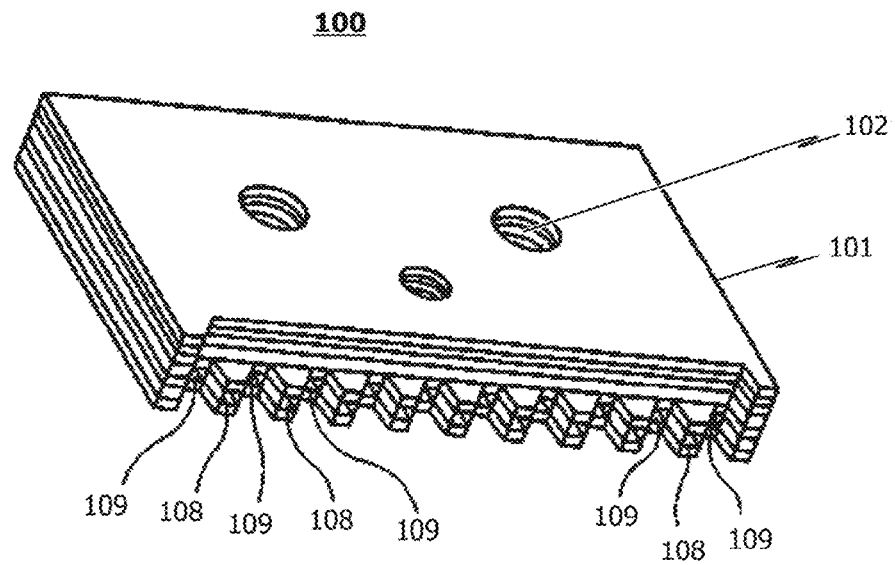
FIG. 1 schematically, a conventional nozzle arrangement with a laminated construction, known in the prior art.

FIG. 1 shows part of a conventional nozzle arrangement 100 known in the prior art, revealing the laminated construction.

Figure 2:
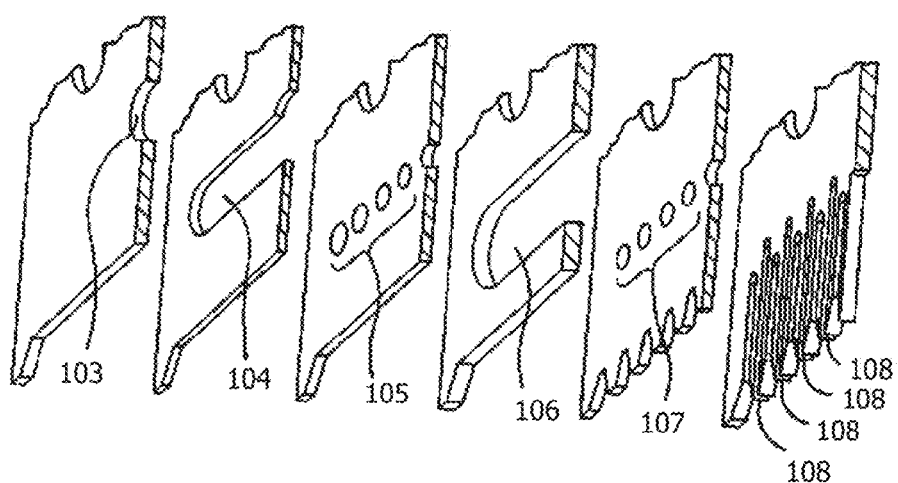
FIG. 2 schematically, the nozzle arrangement known in the prior art per FIG. 1 in an exploded view.

FIG. 2 shows the nozzle arrangement 100 of FIG. 1 in an exploded view.

Specifically, it can be seen in FIGS. 1 and 2 that the conventional nozzle arrangement 100 is composed of a plurality of individual plates 101.1 to 101.6, which are joined flush with each other in the assembled state (see FIG.

1). For this, a pin element can be used, for example, which is inserted through a corresponding hole 102 or through a corresponding opening in the individual plates 101.1 to 101.6 and holds the individual plates 101.1 to 101.6 together.

Various recesses or holes 103 to 107 are provided in the individual plates 101.1 to 101.6, which in the assembled state form a fluid channel system in the main body 101 of the nozzle arrangement 100, in order to connect the individual outlet nozzles 108 at one end face of the nozzle assembly fluidically to a fluid port on the main body 101 of the nozzle assembly.

It can be seen from the representations in FIGS. 1 and 2 that the laminated construction of the nozzle arrangement does not allow the forming of arbitrarily designed fluid channel systems inside the main body 101. Furthermore, the number of individual fluid channel systems in the main body 101 of the nozzle arrangement 100 is limited, as is the number of individual outlet nozzles 108 on the end-side lateral surface of the main body 101.

In order to accomplish a larger number of outlet nozzles 108 and/or a more complex fluid channel system in the main body 101 of the nozzle arrangement 100—as com-pared to the nozzle arrangements 100 known in the prior art—it is proposed according to the inventive subject matter that the nozzle arrangement is a monolithic component generated by an additive manufacturing method.

Figure 3:
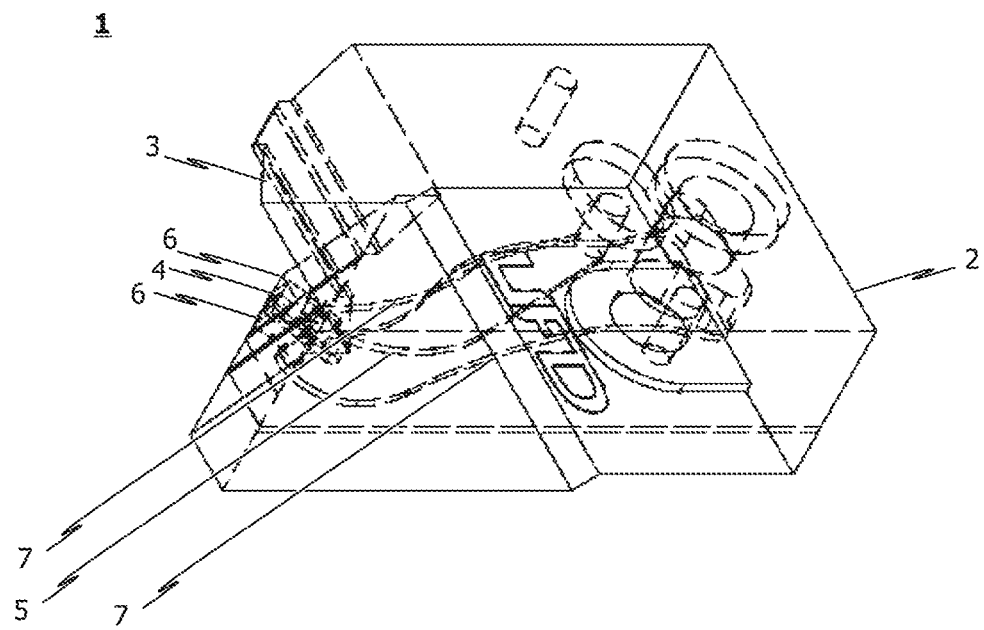
FIG. 3 schematically and in a partially see-through isometric view, an example embodiment of the nozzle arrangement according to the inventive subject matter.
Figure 4:
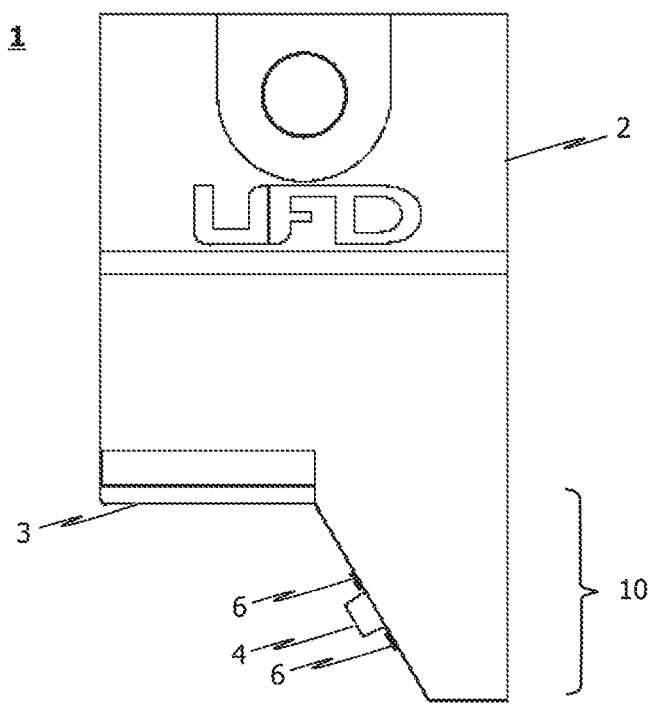
FIG. 4 schematically and in a plan view, the example embodiment of the nozzle arrangement according to the inventive subject matter per FIG. 3.

An example embodiment of the nozzle arrangement 1 according to the inventive subject matter is shown in FIG. 3 (in a partly see-through isometric view) and in FIG. 4 (in a plan view).

Briefly summarized, the example embodiment of the nozzle arrangement 1 according to the inventive subject matter shown schematically in FIG. 3 and FIG. 4 is a monolithic component generated by an additive manufacturing method.

The nozzle arrangement 1 comprises a main body 2 having an end-side lateral sur-face, which is able to be connected, preferably exchangeably, to a mounting region of a distributor or distributor head and having in or on the end-side lateral surface 3 of the main body 2 at least one first outlet nozzle 4 for a fluid to be applied to a substrate with the aid of the nozzle arrangement 1.

Furthermore—as can be seen in particular from the representation in FIG. 3—there is formed in the main body 2 of the nozzle arrangement 1 a first fluid channel system 5, via which the at least one first outlet nozzle 4 is connected fluidically to a first fluid port, which is provided in the main body 2 or on the main body 2 of the nozzle arrangement 1.

Moreover, it can be seen from the representation of FIG. 3 that in or on the end-side lateral surface 3 of the main body 2 there is provided at least one further second outlet nozzle 6 for the purpose of dispensing shaping air in a targeted manner via this at least one second outlet nozzle 6 in order to influence, as needed, the direction of a fluid jet discharged from the at least one first outlet nozzle 5.

It is likewise seen from the partly see-through representation of FIG. 3 that the at least one second outlet nozzle 6 for shaping air is connected fluidically by a second fluid channel system 7 formed in the main body 2 to a second fluid port provided on the main body 2 of the nozzle arrangement 1.

Thanks to the additive manufacturing method with which at least the main body 2 of the nozzle arrangement 1 is produced, it is possible for the first fluid channel system 5 and the at least one further, second fluid channel system 7 to have at least fluid channel sections formed in a partially three-dimensionally curved manner, as can likewise be seen from the representation of FIG. 3.

The example embodiment of the nozzle arrangement 1 according to the inventive subject matter that is shown in FIGS. 3 and 4 is a nozzle arrangement 1 designed in particular to apply fluids, such as thermoplastic adhesives, to substrates with a correspondingly complex geometry.

For this purpose, an extension region 10 is formed on the end-side lateral surface 3 of the main body 2 of the nozzle arrangement 1, in which the at least one first outlet nozzle 4 for the fluid being applied to the substrate is formed. The extension region 10 and the first outlet nozzle 4 are formed such that the outlet opening of the first outlet nozzle 5 is at a distance from the end-side lateral surface 3 of the main body 2 of the nozzle arrangement 1.

Moreover, it may be provided that a main flow axis which is predefined by the outlet opening of the first outlet nozzle 5, along which the thermoplastic adhesive material is discharged from the first outlet nozzle 5, makes an acute angle with the end-side lateral surface 3 of the main body 2.

In the example embodiment of the nozzle arrangement 1 according to the inventive subject matter shown in FIG. 3 and FIG. 4 it is provided in particular that—looking in plan view—the main body 2 of the nozzle arrangement 1 is at least substantially rectangular, and that—likewise looking in plan view—the extension region 10 is at least substantially trapezoidal, and is connected by its longer base side to the end face of the main body 2. Specifically, one leg of the trapezoidal extension region 10 in plan view is flush with a lateral surface 3 of the main body 2.

Moreover, it is provided that the at least one outlet opening of the first outlet nozzle 5 is formed in one leg of the trapezoidal extension region 10 as seen in plan view, situated opposite the leg which is flush with the lateral surface 3 of the main body 2.

In the nozzle arrangement 1 according to the inventive subject matter, the extension region 10 together with the at least one first outlet nozzle 4 in the extension region 10 and together with the rest of the main body 2 of the nozzle arrangement 1 is formed as a monolithic component with the aid of an additive manufacturing method.

Thus, corresponding fluid channel systems 5, 7 can be formed in especially simple manner in the main body 2 and in the extension region 10 of the nozzle arrangement 1, which are fluidically connected to the first outlet nozzle 5 and/or to the second outlet nozzles 6 of the nozzle arrangement 1.

As already indicated and as can be seen schematically in FIG. 3, the outlet opening of the first outlet nozzle 4 is associated with one and preferably with a plurality of further fluid openings, whose main axis along which a fluid (especially pressurized air) is dispensed from the further fluid openings is slanted in the direction of the main flow axis of the outlet opening of the first outlet nozzle 4. Moreover, it is provided that the fluid openings of the second outlet nozzle 6 are offset in regard to the outlet opening of the first outlet nozzle 4 in the direction of the lateral surface 3 of the extension region 10 on or in which the outlet opening of the first outlet nozzle 4 is formed.

With the aid of these fluid openings of the second outlet nozzle 6, it is possible to steer compressed air in the direction of the jet of thermoplastic adhesive dispensed by the first outlet nozzle 5, and thereby deflect the jet of adhesive as needed. In particular, in this way it is possible to deflect the jet of adhesive dispensed through the first outlet nozzle 4 periodically from the main flow axis, for example in order to form an Omega-shaped pattern of the jet of adhesive applied to the substrate.

Figure 5:
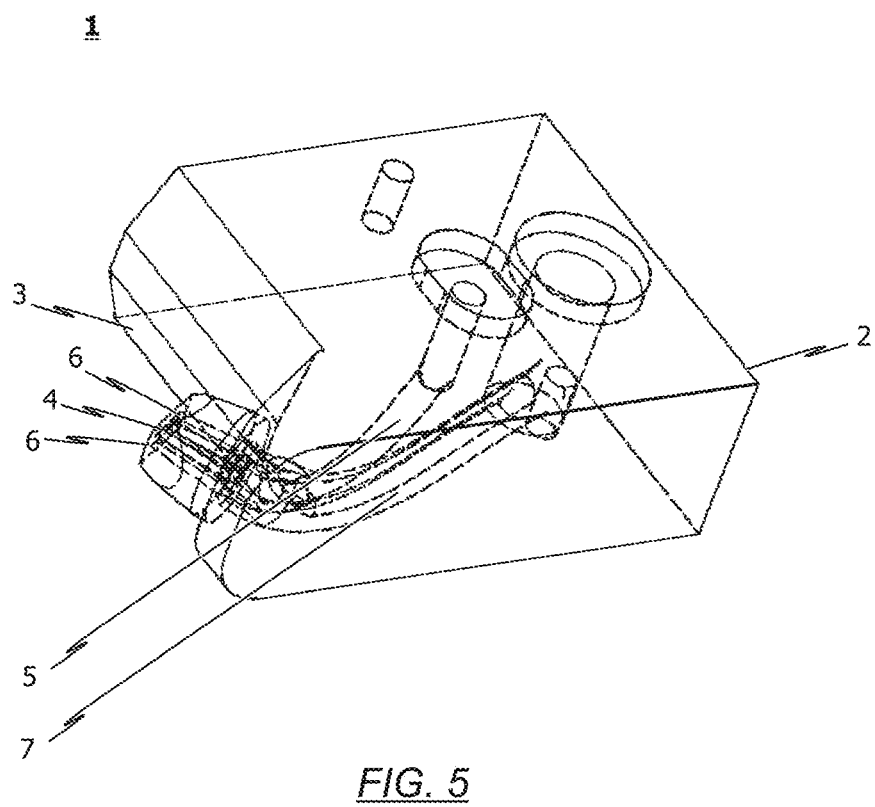
FIG. 5 schematically and in a partially see-through isometric view, another example embodiment of the nozzle arrangement according to the inventive subject matter.

FIG. 5 shows schematically and in a partly see-through isometric view a further example embodiment of the nozzle arrangement 1 according to the inventive subject matter. This nozzle arrangement 1 corresponds substantially in structural and functional respects to the nozzle arrangement 1 of FIG. 3; however, the representation of FIG. 5 shows the fluid channel systems 5, 7 formed in the main body 2, especially their curved configuration in multiple axes.

The inventive subject matter is not confined to the example embodiments shown in the drawings, but rather emerges from a combined consideration of all the features disclosed herein.

What is claimed is:

1. A method for producing a main body of a nozzle arrangement for applying fluids to a substrate, wherein the main body has at least one first outlet nozzle and at least one second outlet nozzle, and wherein, in the main body, there are formed at least one first fluid channel system and at least one second fluid channel system, via which one or more of the at least one first outlet nozzle or the at least one second outlet nozzle are fluidly connected to one or more of a first connector or a second connector on the main body of the nozzle arrangement, wherein the method is an additive production method comprising:
   determining three-dimensional information about the main body, which includes the at least one first outlet nozzle and the at least one second outlet nozzle and in which the at least one first fluid channel system and the at least one second fluid channel system are formed;
   converting the three-dimensional information into multiple layers which define cross-sectional layers of the main body, wherein at least one empty space within at least one of the layers is defined which defines the at least one first fluid channel system and the at least one second fluid channel system, the at least one first fluid channel system and the at least one second fluid channel system having a three-dimensionally curved fluid channel section along multiple axes; and
   successively forming each of the layers of the main body by melting a metallic powder using one or more of laser energy or electron beam energy.

2. The method according to claim 1, wherein successively forming each of the layers of the main body also comprises melting the metallic powder that includes at least one of cobalt-chromium, HS188, or INCO625.

3. The method of claim 2, wherein successively forming each of the layers of the main body also comprises melting the metallic powder having a particle size between approximately 10 μm and approximately 75 μm.

4. The method of claim 1, wherein the main body is at least substantially of right-angled form, and wherein an extension region is at least substantially of trapeziform or triangular form and is connected via a longer base side of the extension region to an end side of the main body.

5. The method of claim 1, wherein an outlet opening of the at least one first outlet nozzle is assigned at least one fluid opening of the second outlet nozzle, the fluid opening having a main flow axis along which the fluid dispensed from the fluid opening of the at least one second outlet nozzle moves, the main flow axis inclined in the direction of the main flow axis of the outlet opening of the first outlet nozzle.

* * * * *